US007009491B2

(12) United States Patent
Rodriguez et al.

(10) Patent No.: US 7,009,491 B2
(45) Date of Patent: Mar. 7, 2006

(54) DUAL PURPOSE VEHICLE KEY FOB FOR TRAINING TIRE PRESSURE SENSORS

(75) Inventors: Hector H. Rodriguez, Chihuahua (MX); Robert A. Newman, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 176 days.

(21) Appl. No.: 10/657,389

(22) Filed: Sep. 8, 2003

(65) Prior Publication Data

US 2005/0052277 A1 Mar. 10, 2005

(51) Int. Cl.

| | |
|---|---|
| ***H04Q 9/00*** | (2006.01) |
| ***B60R 25/10*** | (2006.01) |
| ***B60C 23/00*** | (2006.01) |
| ***B60C 23/02*** | (2006.01) |
| ***G08C 19/22*** | (2006.01) |

(52) U.S. Cl. ............................... 340/5.72; 340/426.36; 340/445; 340/447; 340/446; 340/870.04; 73/146.2

(58) Field of Classification Search ............... 340/5.72, 340/426.36, 445, 447, 446, 426.17, 870.04; 73/146.2, 146.4
See application file for complete search history.

(56) References Cited

U.S. PATENT DOCUMENTS

| | | | | |
|---|---|---|---|---|
| 5,463,374 | A * | 10/1995 | Mendez et al. | 340/442 |
| 6,161,905 | A | 12/2000 | Hac et al. | |
| 6,369,703 | B1 | 4/2002 | Lill | |
| 6,481,806 | B1 | 11/2002 | Krueger et al. | |
| 6,567,012 | B1 * | 5/2003 | Matsubara et al. | 340/825.72 |
| 6,745,624 | B1 * | 6/2004 | Porter et al. | 73/146.2 |

* cited by examiner

*Primary Examiner*—Michael Horabik
*Assistant Examiner*—Scott Au
(74) *Attorney, Agent, or Firm*—Jimmy L. Funke

(57) ABSTRACT

A dual purpose key fob has manipulable keys for, in a normal mode, locking and unlocking a vehicle and keys for opening a vehicle trunk and activating a panic alarm and, in a training mode, for sending code signals to tire pressure sensors to tell the sensors what tire they are in, e.g., after wheel rotation, so that the sensors subsequently can transmit the proper location signals to the vehicle's ECM along with the pressure signals.

20 Claims, 2 Drawing Sheets

DUAL PURPOSE VEHICLE KEY FOB FOR TRAINING TIRE PRESSURE SENSORS

FIELD OF THE INVENTION

The present invention relates generally to tire pressure sensor training devices.

BACKGROUND

There are tire pressure sensors on some vehicles on the market today. These tire pressure sensors send signals to the vehicle's on board computer representing both pressure and tire location to notify the driver when a tire loses pressure and in which tire it is lost. However, the pressure sensors must be calibrated every time the tires are taken off the car and moved (e.g. rotated) to inform the sensors of the location of the tire on the vehicle, so that the subsequent signals from the sensors correctly identify the tire being reported on.

Currently, calibrating the tire pressure sensors is a very cumbersome process that has to be done by trained mechanics using special and rather cumbersome calibration equipment. This requires the vehicle owner to pay a fee to the mechanic and to spend more time waiting for the calibration to be performed. Having made the above critical observations, the present invention is provided.

SUMMARY OF THE INVENTION

A key fob for a vehicle includes a housing holding a processor and a transmitter, and plural user-manipulable keys disposed on the housing. The keys send signals to the processor when manipulated, with at least some keys being dual-purpose keys. In accordance with the present invention, the signals from the dual-purpose keys represent respective tire locations when the key fob is in a first mode and vehicle access commands, also referred to herein as vehicle control signals, when the key fob is in a second mode.

In a preferred embodiment a first dual purpose key may represent a vehicle lock command in the second mode and a first tire location in the first mode, and a second key represents a vehicle unlock command in the second mode and a second tire location in the first mode. Further, a third key can represent a trunk unlock command in the second mode and a third tire location in the first mode, while a fourth key can represent a panic command in the second mode and a fourth tire location in the first mode.

A gain amplifier may be connected to the transmitter, with the processor causing the amplifier to establish a first power level of the transmitter in the first (tire training) mode and a second power level of the transmitter in the second (vehicle access/control) mode. The first power level is less than the second power level.

The processor may change from the second mode to the first mode, explicitly or implicitly, when two keys are manipulated simultaneously. Also, the processor may change from the first mode to the second mode when two keys are manipulated simultaneously. Or, the processor may change from the first mode to the second mode after the elapse of a predetermined timeout period.

In another aspect, a tire training and vehicle command system includes a key fob transmitting vehicle control signals in a first mode and tire location codes in a second mode.

In still another aspect, a tire training system includes a lightweight hand held key fob housing, and command input means on the housing for inputting command signals. The system also includes processor means for receiving the command signals and determining whether the command signals are tire training command signals or vehicle control command signals, with the processor means generating codes based thereon. Transmitter means are connected to the processor means for transmitting the codes received from the processor means.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
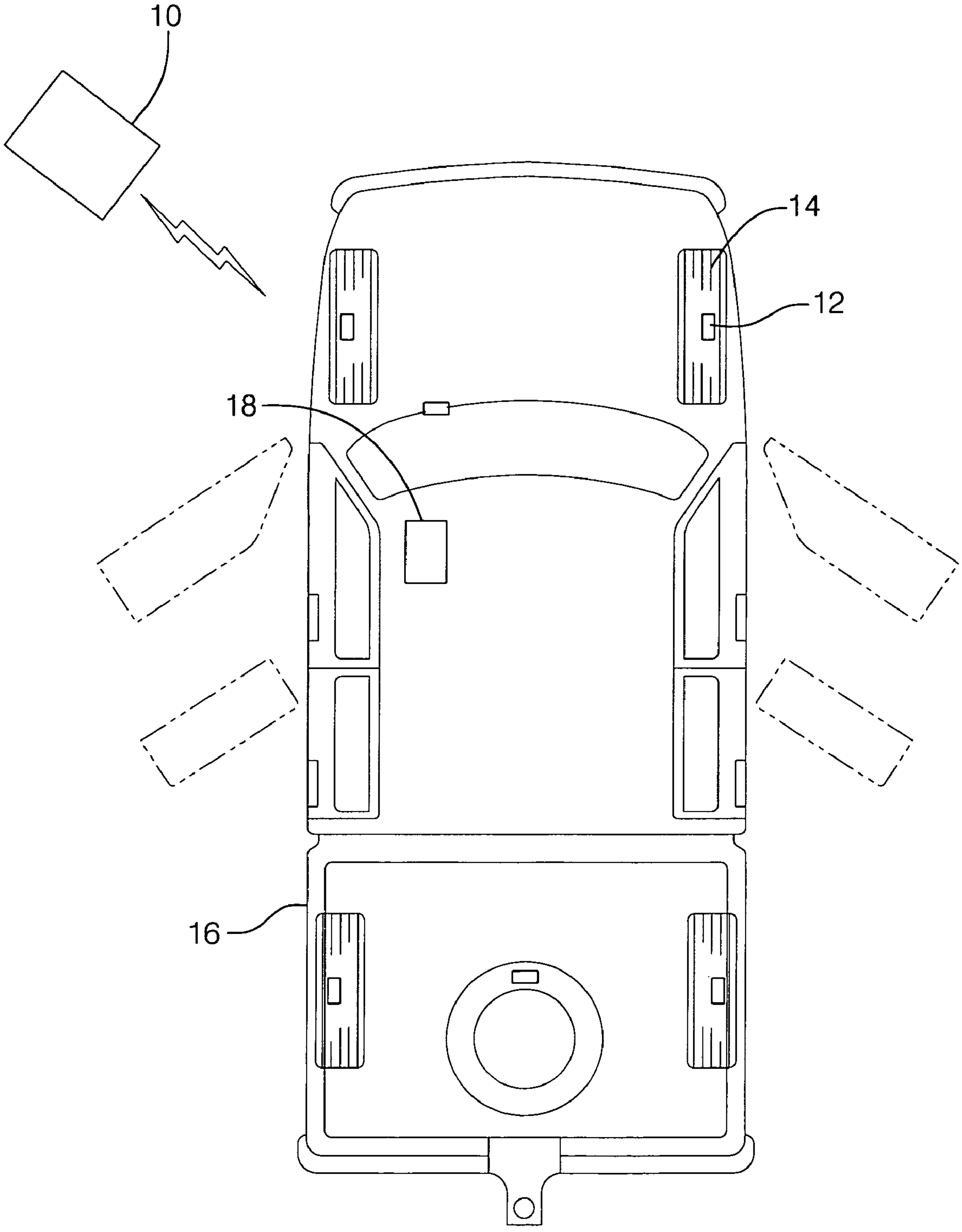
FIG. 1 is a schematic view showing the present key fob in combination with a vehicle having tire pressure sensors.

Referring initially to FIG. 1, a key fob is shown, generally designated 10, that can be used to calibrate each tire pressure sensor 12 located in the respective tires 14 of a vehicle 16. The calibration involves notifying each tire pressure sensor 12 where it is located on the vehicle 16 (e.g. left-front), as more fully described below. It is to be understood that each tire 14 on the vehicle 16 can contain one of these tire pressure sensors 12 which senses air pressure in the tire and relays (by, e.g., rf link) the pressure information, along with a code representing the tire location, to an engine control module 18. In accordance with principles known in the art, the ECM 18 can notify the driver of tire pressure and activate an alarm or warning lamp if tire pressure falls below a threshold.

Preferably, the signal used by the key fob 10 is a relatively high frequency typically used for remote keyless entry, e.g., 315 MHz, 433.92 MHz, or 868 MHz, as opposed to the relatively low (125 KHz) frequencies used on current tire pressure training devices. Among other things, the use of a frequency in the range of hundreds of megaHertz facilitates the use of a smaller antenna than is possible on lower frequency systems.

Figure 2:
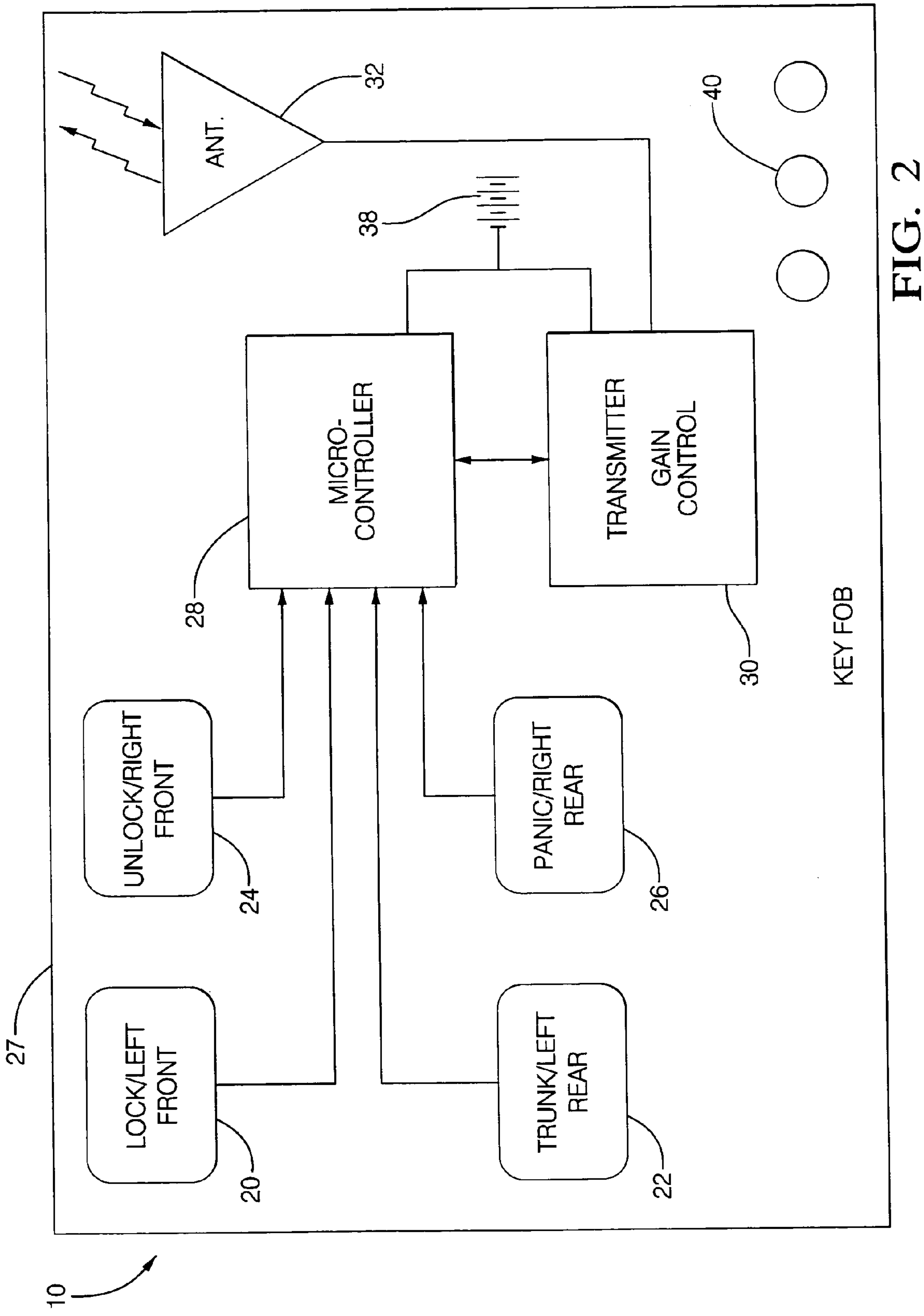
FIG. 2 is a plan view of a preferred embodiment of the key fob.

Referring now to FIG. 2, according to present principles the key fob 10, through dual-purpose keys and the microcontroller discussed below, may assume two modes, namely, vehicle control and tire pressure sensor calibration. In the preferred embodiment four dual purpose keys 20, 22, 24, 26 are provided on a light weight hand held hollow plastic key fob housing 27, it being understood that greater or fewer dual purpose keys may be provided depending on the type of vehicle. Each of the four dual-purpose keys 20-26 performs a vehicle control task in the vehicle control mode (e.g. unlock doors, open trunk, etc.) and a calibration task of a respective tire pressure sensor to the appropriate location on the car in the calibration mode.

More specifically, in an illustrative non-limiting embodiment a top-left key 20 doubles as both a vehicle lock command generator in the vehicle control mode and as a calibration signal generator for the left-front tire in the calibration mode. Located at the bottom left of the fob, a second key 22 generates a trunk unlock/release signal when temporarily depressed in the vehicle control mode, with the signal from the second key 22 indicating, in the calibration mode, a left rear tire location indication. In contrast, a third key 24, located at the top-right of the preferred non-limiting key fob 10, serves as both a vehicle unlock command key and as a right front tire location indicator. Finally, a fourth dual-purpose key 26, which may be located at the bottom right of the key fob 10, performs the tasks of a panic indicator in the vehicle control mode and right rear tire location indicator in the calibration mode. Although not shown, single purpose keys may also be provided on the key fob 10. If desired, only three keys need be provided, in which case depressing each key individually in the training mode represents three tire locations, with the fourth tire location being indicated by depressing two of the keys simultaneously.

The signals that are generated by the keys 20–26 when they are manipulated by a user are sent to a microcontroller 28, which interprets the signals depending on the mode of the key fob 10. In the first (vehicle control) mode, the signal from any key 20–26 that is manipulated is interpreted to take on its vehicle control function. The microcontroller 28 processes the command and sends a signal to a gain amplifier/transmitter 30 to transmit, at a relatively high power level, the desired vehicle control code via, e.g., rf or other wireless link to the ECM 18. That is, the preferred transmitter 30 sends the desired vehicle control message to the engine control module on board the vehicle through an antenna 32. The signal is recognized on board the vehicle and the command is initiated.

As described above, the vehicle control mode is a default mode of the key fob 10 in which a vehicle control signal is transmitted to the ECM 18 depending on which one of the dual-purpose keys 20–26 has been manipulated. To enter the second (calibration) mode, wherein one or more tire pressure sensors (12) may be calibrated to their respective locations, two of the dual-purpose keys 20–26 can be simultaneously manipulated. Which keys are pressed to enter the calibration mode can be predetermined (e.g., lock and unlock) or the calibration mode can be entered when any two keys are simultaneously depressed. Or, simply toggling a key quickly can indicate a vehicle control mode signal, while holding down a key for a predetermined period can indicate a desire to enter the calibration mode and, hence, indicate a calibration signal. Regardless, once the key fob microcontroller 28 is in the calibration mode, it causes the gain amplifier/transmitter 30 to transmit tire locations codes at relatively low power, such that only the tire pressure sensor 12 that is closest to the key fob 10 (say, within a few feet) can detect the signal from the key fob 10. Specifically, in the calibration mode manipulations of the dual-mode keys 20–26 cause the microcontroller 28 to transmit (at low power) tire location codes, e.g. “you are the left front”. The pressure sensor 12 that is close enough to the key fob 10 to receive the location code thereafter, when it transmits its pressure signal to the vehicle’s onboard computer (engine control module), not only transmits a code that indicates the pressure but also that indicates which sensor it is as indicated by the code from the microcontroller 28. Preferably, upon being trained a sensor initially transmits its identity to the vehicle onboard computer (ECM 18) and its location, but the sensor need not retain its location in its own memory thereafter. Instead, for subsequent pressure transmissions the onboard computer 18 correlates the sensor identification, which is transmitted in every pressure message sent by the sensor, with the initially reported location, to relieve the sensor itself from having to store and transmit its location every time it reports tire pressure.

The key fob 10 can leave the calibration mode and reenter the normal vehicle control mode after an elapsed amount of time and/or by pressing two keys 20–26 simultaneously again.

It is to be understood that if four buttons are provided, the training mode can be implicitly established simply by depressing different combinations of two keys simultaneously. For example, depressing simultaneously the first and second keys can indicate a left front tire location, depressing simultaneously the first and third keys can indicate a left rear tire location, depressing simultaneously the first and fourth keys can indicate a right front tire location, and depressing simultaneously the second and third keys can indicate a right rear tire location. When the microcontroller 28 determines that two buttons are depressed simultaneously, the microcontroller 28 essentially enters a training mode wherein it causes the transmitter 30 to transmit, at reduced power levels, a training signal indicating the appropriate tire position.

Power to the electrical components can be supplied by a small DC alkaline or Lithium battery 38 in the housing 27. If desired, plural LEDs 40 can be provided on the housing 27 to indicate which mode the key fob is in, whether the battery 38 has sufficient charge, whether the transmitter 30 is transmitting, etc.

While the particular DUAL PURPOSE VEHICLE KEY FOB FOR TRAINING TIRE PRESSURE SENSORS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean “one and only one” unless explicitly so stated, but rather “one or more”. It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. ’112, sixth paragraph, unless the element is expressly recited using the phrase “means for” or, in the case of a method claim, the element is recited as a “step” instead of an “act”. Absent express definitions herein, claim terms are to be given all ordinary and accustomed meanings that are not irreconcilable with the present specification and file history.

What is claimed is:

1. A key fob for a vehicle, comprising:

a housing holding a processor and a transmitter; and plural user-manipulable keys disposed on the housing and sending signals to the processor at least when manipulated, at least some keys being dual-purpose keys, the signals from the dual-purpose keys representing respective tire locations when the key fob is in a first mode, the signals from at least some of the dual-purpose keys representing respective vehicle access commands when the key fob is in a second mode.

2. The key fob of claim 1, wherein the dual purpose keys include:

a first key representing a vehicle lock command in the second mode and a first tire location in the first mode; and a second key representing a vehicle unlock command in the second mode and a second tire location in the first mode.

3. The key fob of claim 2, wherein the dual purpose keys include:

a third key representing a trunk unlock command in the second mode and a third tire location in the first mode; and a fourth key representing a panic command in the second mode and a fourth tire location in the first mode.

4. The key fob of claim 1, comprising a gain amplifier connected to the transmitter, the processor causing the amplifier to establish a first power level of the transmitter in the first mode and a second power level of the transmitter in the second mode, the first power level being less than the second power level.

5. The key fob of claim 1, wherein the processor changes at least from the second mode to the first mode when at least two keys are manipulated simultaneously.

6. The key fob of claim 1, wherein the processor changes at least from the first mode to the second mode when at least two keys are manipulated simultaneously.

7. The key fob of claim 1, wherein the processor changes at least from the first mode to the second mode after the elapse of a predetermined timeout period.

8. The key fob of claim 1, wherein the first mode is implicitly established by the simultaneous manipulation of two keys.

9. A tire training and vehicle command system, comprising:

a key fob transmitting vehicle control signals at least in a first mode and tire location codes at least in a second mode: and plural dual keys on the key fob and at least one processor supported by the key fob and receiving signals from the keys, wherein the signals from the dual-purpose keys represent a respective tire location when the key fob is in a first mode, and the signals from at least some of the dual-purpose keys represent respective vehicle access commands when the key fob is in a second mode.

10. The system of claim 9, wherein a first key represents a vehicle lock command in the first mode and a first tire location in the second mode; and a second key represents a vehicle unlock command in the first mode and a second tire location in the second mode.

11. The system of claim 10, wherein a third key represents a trunk unlock command in the first mode and a third tire location in the second mode; and a fourth key represents a panic command in the first mode and a fourth tire location in the second mode.

12. The system of claim 9, comprising a gain amplifier connected to a transmitter in the key fob, the processor causing the amplifier to establish a first power level of the transmitter in the first mode and a second power level of the transmitter in the second mode, the first power level being more than the second power level.

13. The system of claim 9, wherein the processor changes at least from one mode to the other mode when at least two keys are manipulated simultaneously.

14. The system of claim 9, wherein the second mode is implicitly established by the simultaneous reception of signals from two keys.

15. A tire training system, comprising:

a lightweight hand held key fob housing;

command input means on the housing for inputting command signals;

processor means for receiving the command signals and determining whether the command signals are tire training command signals or vehicle control command signals, the processor means generating codes based thereon; and transmitter means, connected to the processor means for transmitting the codes received from the processor means;

wherein the signals from the dual-purpose keys represent a respective tire location when the key fob is in a first mode, and the signals from at least some of the dual-purpose keys represent respective vehicle access commands when the key fob is in a second mode.

16. The system of claim 15, wherein the command input means include plural dual purpose keys, the processor means includes a processor, and the transmitter means includes a wireless transmitter.

17. The system of claim 16, wherein a first key represents a vehicle lock command in a vehicle control mode and a first tire location in a tire pressure sensor training mode; and a second key represents a vehicle unlock command in the vehicle control mode and a second tire location in the tire pressure sensor training mode.

18. The system of claim 16, wherein a third key represents a trunk unlock command in the vehicle control mode and a third tire location in the tire pressure sensor training mode; and a fourth key represents a panic command in the vehicle control mode and a fourth tire location in the tire pressure sensor training mode.

19. The system of claim 16, comprising a gain amplifier connected to the transmitter, the processor causing the amplifier to establish a first power level of the transmitter in the vehicle control mode and a second power level of the transmitter in the tire pressure sensor training mode, the first power level being greater than the second power level.

20. The system of claim 15, wherein the processor changes at least from one mode to another mode when at least two keys are manipulated simultaneously.

* * * * *